United States Patent
Creech et al.

(10) Patent No.: US 8,861,118 B1
(45) Date of Patent: Oct. 14, 2014

(54) DISK DRIVE WITH SERVO SYSTEM PROVIDING TIME-SYNCING FOR GAPLESS SECTORS

(71) Applicant: HGST Netherlands B.V., Amsterdam (NL)

(72) Inventors: William Gary Creech, Morgan Hill, CA (US); Timothy John Everett, Niwot, CO (US); James Bowling French, Jr., Longmont, CO (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/135,081

(22) Filed: Dec. 19, 2013

(51) Int. Cl.
*G11B 5/09* (2006.01)

(52) U.S. Cl.
USPC .............................................. 360/49; 360/52

(58) Field of Classification Search
None
See application file for complete search history.

(56) References Cited

U.S. PATENT DOCUMENTS

| | | | |
|---|---|---|---|
| 5,847,894 A | 12/1998 | Blank et al. | |
| 6,078,445 A | 6/2000 | Serrano et al. | |
| 6,104,568 A | 8/2000 | Drouin et al. | |
| 6,967,808 B1 | 11/2005 | Bandic et al. | |
| 7,110,209 B2 | 9/2006 | Ehrlich et al. | |
| 7,113,362 B1 | 9/2006 | Lee et al. | |
| 7,193,800 B2 | 3/2007 | Coker et al. | |
| 7,349,167 B2 | 3/2008 | Erden et al. | |
| 7,551,379 B2 | 6/2009 | Yu et al. | |
| 7,663,830 B2 | 2/2010 | Jo et al. | |
| 8,000,048 B2 | 8/2011 | Wilson | |
| 8,477,442 B2 | 7/2013 | Albrecht et al. | |
| 8,711,504 B1 | 4/2014 | Everett et al. | |
| 2009/0168227 A1 | 7/2009 | Blaum et al. | |
| 2011/0149432 A1 | 6/2011 | Coker et al. | |
| 2011/0149433 A1 | 6/2011 | Coker et al. | |
| 2011/0149434 A1 | 6/2011 | Coker et al. | |
| 2011/0181977 A1 | 7/2011 | Kim et al. | |
| 2012/0087036 A1 | 4/2012 | Hirano et al. | |

FOREIGN PATENT DOCUMENTS

WO    WO/99/06992    11/1999

*Primary Examiner* — Paul Huber
(74) *Attorney, Agent, or Firm* — G. Marlin Knight

(57) ABSTRACT

Disk drives with servo systems are described that include a servo ID pattern (SID) with a SAM field, as well as, one or more Integrated Servo sequences designed to provide a redundant sync mark function. The write-to-read gaps are omitted before selected servo sector SIDs. For example, write-to-read gaps can be omitted before alternating servo sector SIDs. When in write-mode that allows writing an extended user data sector without a write-to-read gap, the servo system delays the servo gate assertion with respect to the following SID to accommodate the absence of the write-to-read gap, which means that the SAM field cannot be read, but the Integrated Servo sequence(s) can be read and detected by the digital filters. Embodiments of the invention include sync mark timing for each SID (not just every other SID) even when writing extended user data sectors by using the Integrated Servo sequences to provide a sync timing function.

7 Claims, 5 Drawing Sheets

DISK DRIVE WITH SERVO SYSTEM PROVIDING TIME-SYNCING FOR GAPLESS SECTORS

RELATED APPLICATION

The present application is related to commonly assigned application bearing Ser. No. 13/718,278, which has a filing date of Dec. 18, 2012.

The present application is also related to commonly assigned application bearing Ser. No. 13/896,159, which has a filing date of May 16, 2013.

The present application is also related to commonly assigned application bearing Ser. No. 13/896,209, which has a filing date of May 16, 2013.

FIELD OF THE INVENTION

This invention relates generally to information storage systems using rotating disks, and more particularly to servo systems and servo patterns on recording disks used to selectively position transducers (heads) over tracks on the rotating disks.

BACKGROUND

FIG. 1 is a block diagram illustrating selected components of an information storage system (disk drive) 110 according to the prior art. Disk drives have one or more disks 111 on which ferromagnetic thin materials are deposited. The disk drive includes data recording disk 111, pivoting actuator arm 113, and slider 31 that includes a read head and a write head (not shown). The functional blocks include servo system 90, read/write electronics 114, interface electronics 115, controller electronics 116, microprocessor 117, and RAM 118. A disk drive can include multiple disks stacked on a hub that is rotated by a disk motor, with a separate slider for each surface of each disk. The term servo wedge 120 will be used to mean the contiguous set of servo fields extending from ID to OD on the disk.

Disk 111 will typically have multiple servo wedges 120 arranged radially around the disk, but only two are shown for simplicity. Information recorded on the disks is generally organized in concentric tracks or, alternatively, the tracks can be arrange in a plurality of spiral tracks. (For a description of spiral tracks see, for example, U.S. Pat. No. 7,113,362 Lee, et al. Sep. 26, 2006.) In embodiments either of these tracks organizations can be used, and the term "tracks" will be used generically to include these any other similar forms of arrangement.

As part of the manufacturing process permanent servo information is recorded on the disks that provides information to the system about the position of the heads when the disks are rotating during operation. The servo identifier (SID) data on the disk provides several fundamental functions and is conventionally arranged in four distinct fields in each of the plurality of servo sectors angularly spaced around the disk. FIG. 2B illustrates the fields in a selected servo ID (SID) 20 according to the prior art. The preamble precedes servo address mark (SAM) which is a timing mark which is used to synchronize data within the servo fields, and also provides timing information for write and read operations in the data portions of the disk. Second, the SID track-ID (TID) number and additional information to identify the physical SID number. The servo field supplies a multi-bit digital track-ID (TID) number, which is typically written in Gray code. During seek operations, when the head is moving across tracks, the head can typically only read a portion of the Gray-code in each TID. Therefore, the Gray-code is constructed so that pieces of the TID, in effect, can be combined from adjacent tracks to give an approximate track location during a seek.

The SID also supplies a position error field (A & B bursts in this example), which provides the fractional-track Position Error Signal (PES). A repeatable run-out (RRO) field follows the PES bursts in this example. During read or write operations the drive's servo control system uses the PES servo information recorded on the disk surface as feedback to maintain the head in a generally centered position over the target data track. The typical PES pattern includes a burst pattern in which the bursts are identical sets of high frequency magnetic flux transitions. Unlike the track-ID (TID) field number, the PES bursts do not encode numerical information. In contrast to the TID, it is the position of the bursts that provide information on where the head is relative to the centerline of a track.

Each of these servo functions typically consumes a relatively independent portion of the servo wedge in conventional servo systems. Typically, the servo fields consume a significant portion of the recording surface of the disk and are, therefore, an attractive target for reduction.

The Integrated Servo concepts which are referenced herein are described in published U.S. patent applications:

20110149434 by Coker, et al. (pub. Jun. 23, 2011), Ser. No. 12/653,874, filed Dec. 18, 2009;

20110149433 by Coker, et al. (pub. Jun. 23, 2011), Ser. No. 12/653,863, filed Dec. 18, 2009; and 20110149432 by Coker, et al. (pub. Jun. 23, 2011), Ser. No. 12/653,862, filed Dec. 18, 2009.

Embodiments of the Integrated Servo concept implement some or all major servo subfunctions for a storage device in Integrated Servo fields comprising sequences of encoded bits having selected mathematical properties. The Integrated Servo field is composed of one or more encoded sequences, which are members of a selected allowable sequence set that is constrained to provide some or all of the following functions: the Servo Address Mark (SAM), the Position Error Signal (PES) and higher level positional information such as the track-ID. The Integrated Servo fields can also provide a fractional Position Error Signal (PES) in relation to the center of a data track through the relative amplitude of the signal read for adjacent sequences disposed laterally across the tracks. The servo system detects the sequences in the signal from the read head using a set of digital filters corresponding to the set of encoded sequences. Embodiments of Integrated Servo constraint the placement of sequences so that only mathematically orthogonal sequences are placed next to each other on adjacent tracks.

As illustrated in FIG. 2A a write-to-read gap 33 is included in the track structure to allow for the physical separation between the write head 32 and the read head 33 in slider 31 and to provide the time/distance needed to switch from writing data to reading the next servo sector ID (SID) 20. The servo gate assertion period (window) 25A begins in the preamble and ends in this example with the RRO field. The bulk of the write-to-read gap is caused by the physical separation between the writer and reader in the slider. In most head designs the reader leads the writer as shown, so when the writer reaches the end of the data sector, the reader is already some distance beyond the end of the data sector which creates a physical gap. In addition some gap is needed to allow for the time needed for the drive's control systems to switch from writing to reading, but this switching gap is much smaller than the physical writer-to-reader separation. Accordingly servo systems have typically included a write-to-read gap 33 in the track format between the end of a writable data sector and the start of the following servo sector information.

SUMMARY OF THE INVENTION

Disk drive embodiments with a servo system according to the invention include a servo ID pattern (SID) with a SAM field, as well as, one or more Integrated Servo sequences designed to provide a redundant timing sync mark function. The write-to-read gaps are omitted before the selected servo sector SIDs. For example, write-to-read gaps can be omitted before alternating servo sector SIDs. When in write-mode that allows writing an extended user data sector without a write-to-read gap, the servo system's servo gate assertion is delayed in relation to the following SID as a result of the absence of the write-to-read gap, which means that the SAM field cannot be read, but the Integrated Servo sequence(s) can be read and detected by the digital filters. Embodiments of the invention include synchronization timing (time syncing) for each SID (not just every other SID) even when writing extended user data sectors by using the Integrated Servo sequences to provide a sync-timing function. The prior art mini-mode servo technique does not provide sync-mark to sync-mark timing between SID bursts, i.e., it only times between every other SID when writing extended user data sectors. Thus, in embodiments of the invention user data space gained by including the gapless sectors is maintained without loss of sync-timing between SIDs.

During seeking and reading operations the SIDs in a servo system according to embodiments of the invention can be read in the standard way for every servo wedge. The gapless SIDs are read and used normally during read operations.

DETAILED DESCRIPTION OF THE INVENTION

Figure 1:
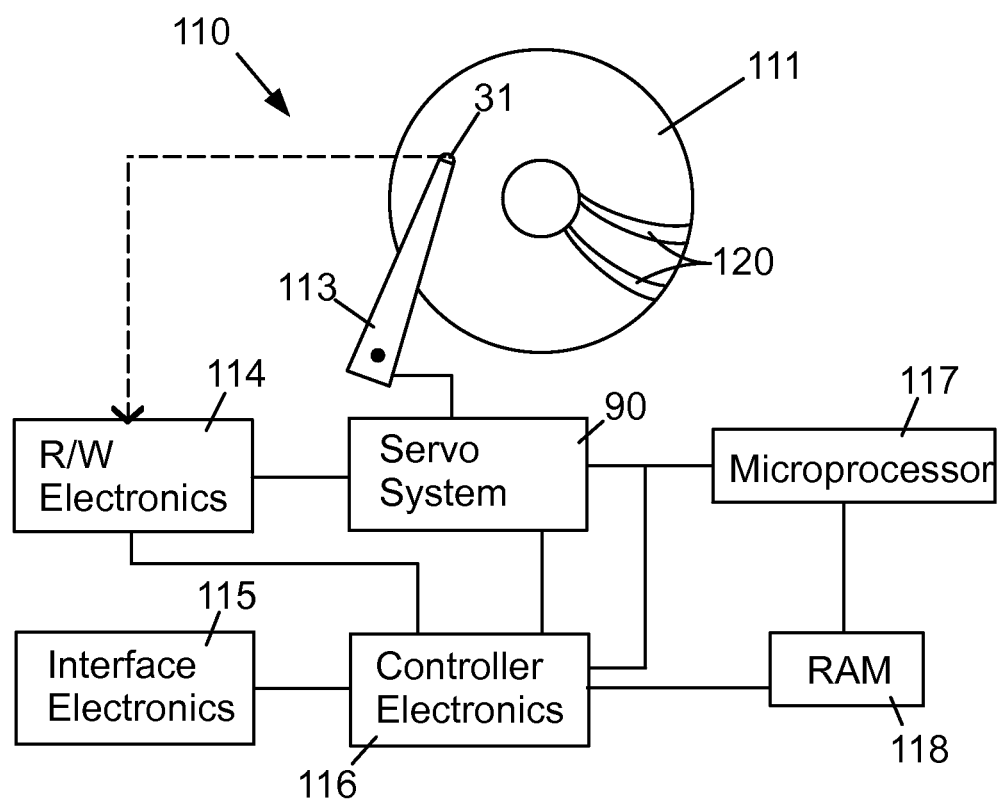
FIG. 1 is a block diagram illustration of selected functional components of a prior art disk drive.
Figure 2A:
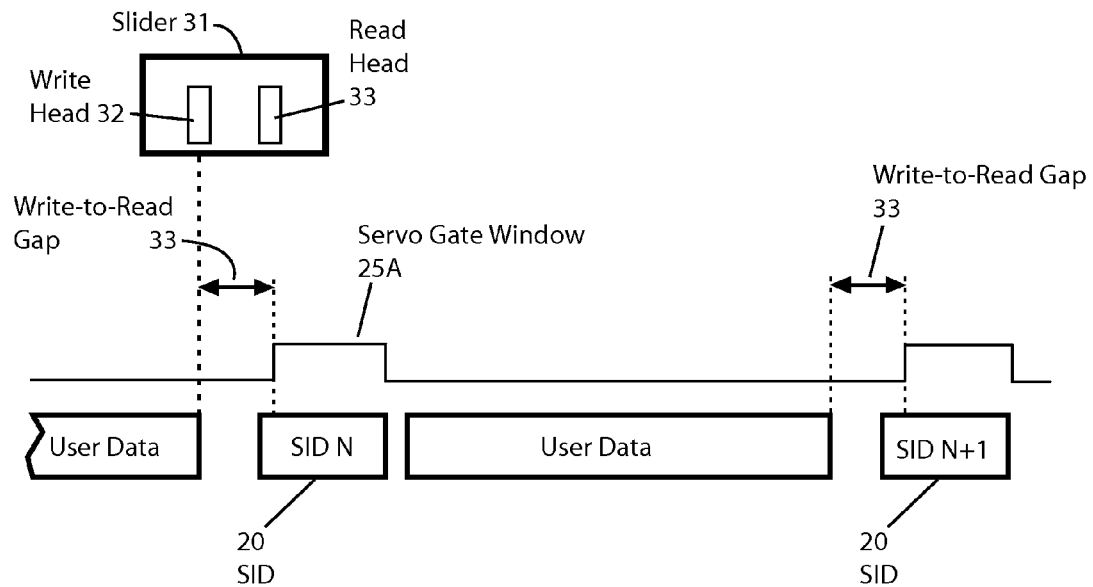
FIG. 2A is an illustration of two selected SID fields with write-to-read gaps arranged on a track according to the prior art.
Figure 2B:
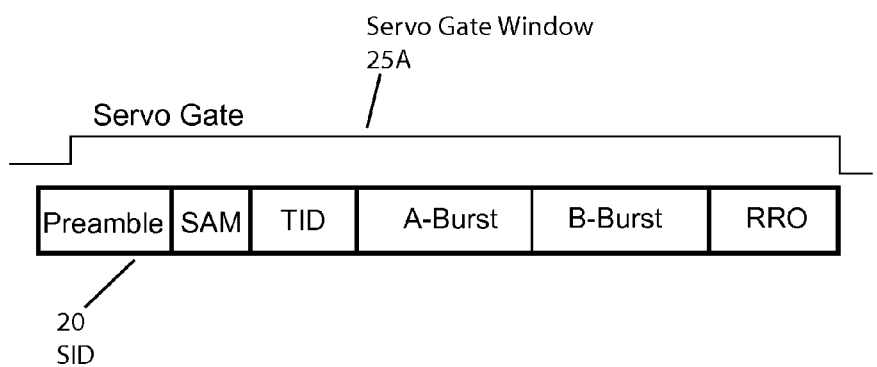
FIG. 2B is an illustration of components of the SIDs according to the prior art.
Figure 3:
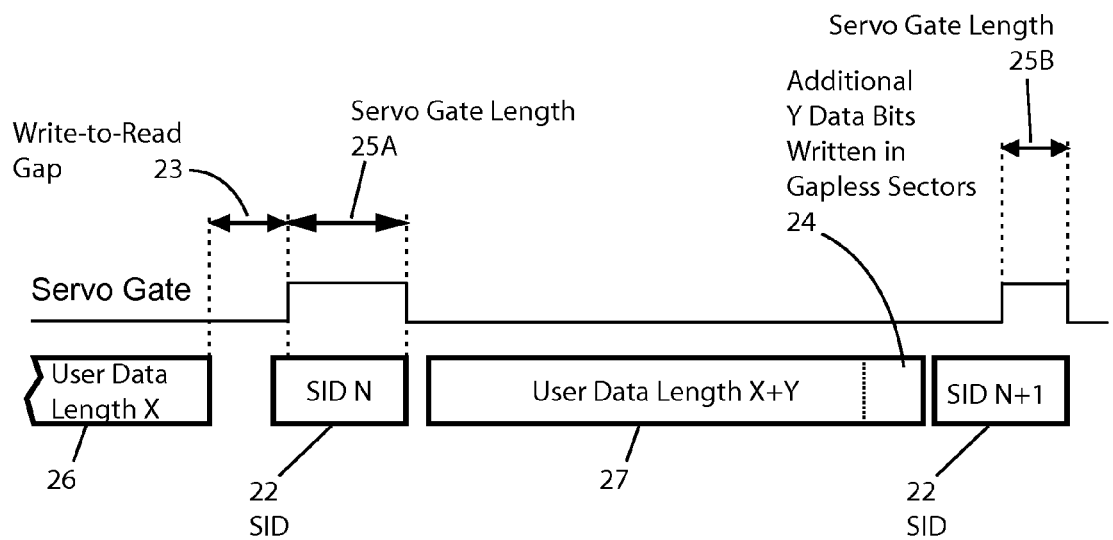
FIG. 3 is an illustration of servo gate timing and data servo fields arranged on a track in a "mini-mode" prior art system.
Figure 4:
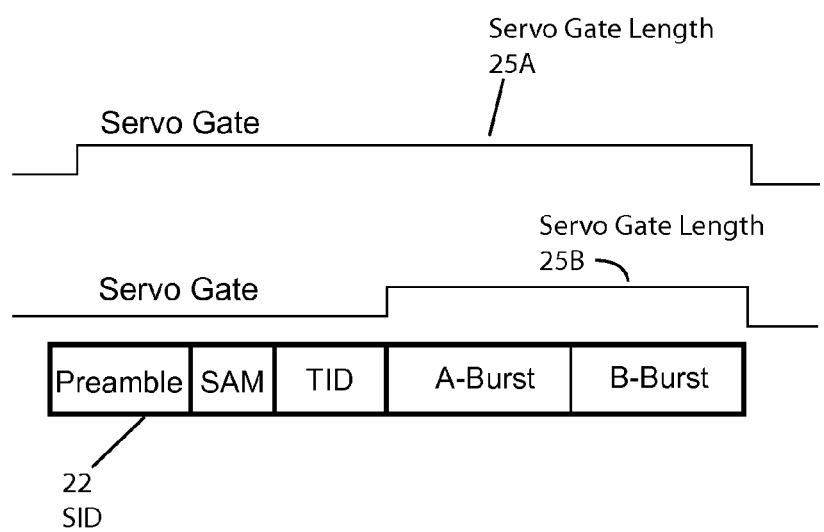
FIG. 4 is an illustration of servo gate timing in a "mini-mode" prior art system.

FIG. 3 is an illustration of data servo fields arrangement on a track in a "mini-mode" prior art system. FIG. 4 is an illustration of fields and servo gate timing in a "mini-mode" prior art system. Two selected consecutive SIDs (N & N+1) 22 are illustrated. The slider with the read and write heads will pass over SID N first as the disk rotates, i.e. SID N+1 is down-track from SID N. As shown in FIG. 2A the read head is typically physically ahead of the write head in the slider. The track will have many more such SIDs arranged in a repeating pattern. An illustration of the internal structure/content of an example of the fields of the SIDs 22 is shown in FIG. 4.

The spacing between the SIDs is also constant around a track just as is the case in the prior art. Because each of the SIDs have the preamble, SAM and TID fields, they can all be read during seeking operations. Accordingly the ability of the servo system to read the TIDs and know where the head is, is not reduced.

As illustrated in FIG. 3, the SID N+1 will be called a gapless SID, because user data 27 including additional Y data bits 24 has been written in the area preceding the SID N+1. As shown in the illustration, user data 26 preceding SID N has X data bits and has a substantial write-to-read gap 23 preceding it, and the SID N+1 has no substantial write-to-read gap. In other words, the last bit of user data 27 is substantially closer to the SID N+1 than is the case for user data 26. In practice a small tolerance gap still exists between the data and the start of SID N+1 to allow for inherent variations in timing and positioning during drive operation and time needed to switch from writing to reading. The required tolerance gap is substantially smaller than the write-to-read gap.

The gapless SIDs can be arranged in a repeating pattern such as every other one (odd and even) as shown in FIG. 3. Other patterns can be used as well. For example, embodiments can have two gapless sectors for each one with a write-to-read gap. Similarly the ratio of gapless sectors can be 3:1, 4:1, etc. The trade-off for higher ratios of gapless SIDs is the reduced frequency of SAM/TID reading during write operations.

In the prior art, full position and timing information can typically be read from all of the servo sectors while writing data to the disk. In mini-mode servo, the servo gate timing and read channel configuration are modified to read only the fractional track fine position information from the PES bursts signals in the gapless subset of the servo sectors when writing the preceding sector of user data.

As shown in FIG. 3, the servo gate length 25A for the gapped SID is significantly longer than the servo gate length 25B for the gapless SID during write operations. The servo gate length 25A is consistent with conventional servo system operation, but servo gate length 25B is less because the start of the servo gate pulse is delayed until the read head is in position to read the A-burst as illustrated in FIG. 4. Thus, the servo gate signal is off when the SAM and TID pass under the read head and these fields are not used. The mini-mode servo cannot, by design, provide SAM timing information on every servo sector, because mini mode does not have secondary SAM information built into the servo sector such as can be the case in Integrated Servo applications. Accordingly, the servo system is not reading the TID or SAM for the gapless SID when the preceding sector was written, but it is reading the PES bursts and can adjust the fractional track position of the head in the standard way. As an example, the duration of the servo gate signal 25B could be on the order 180 ns for a practical drive, i.e. substantially less than the comparable 480 ns servo gate signal 25A.

The embodiments described above are the most straightforward from a servo system perspective, but having different length data sectors adds complexity to other systems in the disk drive. An alternative will be described that keeps the data sectors equal in length and uses the additional space for a dual RRO field. Preferably the RRO field data is exactly the same length as the space freed up by eliminating the gaps. Some disk drive designs do not use RRO fields, so this alternative it not useful in those cases.

The RRO fields cannot be moved independently from the other fields in the SID, so the RRO field cannot be placed directly into the space in front of the gapless SIDs. Instead the RRO fields are placed at the end of the gapped SIDs (i.e. at the beginning of the "gapless user data area" instead of the end of the "gapless user data area") then the gapless user data area remains the same length, it is just delayed by the length of the RRO field. In comparison to a standard RRO implementation, the RRO fields are removed from the end of every SID, bundled into a "dual-RRO field" and added onto the end of every gapped SID. This increases both gapless and gapped user data areas by the length of the original RRO fields.

The SID format can be the same for gapped and gapless SIDs as described above, but in an alternative, a dual RRO field can be included in the gapped SID and omitted in the gapless SIDs. The additional space that is freed up by omitting the write-to-read gap is used by the dual RRO field. The dual RRO field is larger than a comparable single RRO field. If the gapless sector is reduced equally at the front end (partial preamble SAM and TID) and the backend (RRO field) then the data sectors are extended equally for the gapped sectors and the gapless sectors.

Figure 5A:
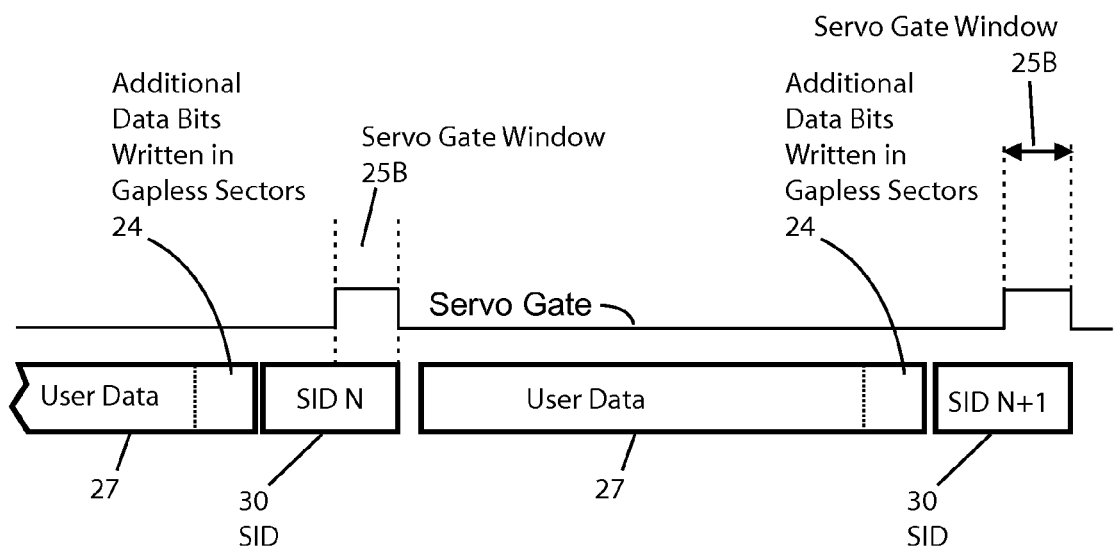
FIG. 5A is an illustration of two consecutive SID fields without write-to-read gaps arranged on a track according to the prior art.
Figure 5B:
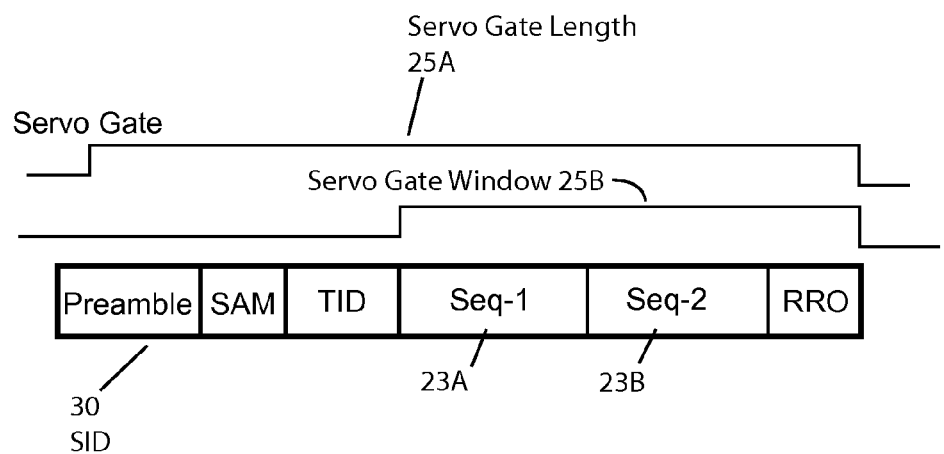
FIG. 5B is an illustration of the servo gate timing in relation to the fields in a prior art Integrated Servo pattern.

FIG. 5B is an illustration of the fields in a prior art Integrated Servo pattern 30 with the pair of Integrated Servo sequences 23A, 23B. In this example the complete track ID information is in TID field which encodes the entire track ID in Gray code. The Integrated Servo sequences 23A, 23B (Seq-1, Seq-2), provide a PES, a SAM and can also encode selected information such as the sector identifier. The manner in which Integrated Servo sequences encode information and provide a PES and SAM are described in published U.S. patent applications identified above. An optional separate RRO field can be included.

In general, the Integrated Servo sequences can be designed to supply multiple functions including all or part of the TID, SAM, RRO and PES as described in the cited published patent applications. The fractional PES is supplied by the relative amplitude of the read head signal generated from two or more sequences disposed laterally across the tracks. Additional information is encoded in the selection and arrangement of the specific sequences from track to track and sector to sector. Extraction of the encoded information requires decoding or reading each sequence in the servo pattern and then converting this sequence combination into numerical values which give the predetermined information, for example, for the LSBs of the track identifier, etc. The number of bits allocated to the Gray code versus the Integrated Servo sequences can vary according to the specific application. The sector number can be encoded using the Integrated Servo sequences according to standard encoding schemes.

FIG. 5A is an illustration of two consecutive SID Integrated Servo fields 30 without write-to-read gaps arranged on a track according to the prior art. Although only two are shown, a track will have a large number of SIDs. The user data 27 is extended by the area 24 which is where the write-to-read gaps would otherwise occur. The servo gate window 25B in this example applies only to the case where the servo system is in writing-mode, which precludes the reading of the dedicated SAM. For example, when user data has been written immediately before the SID 30 without a write-to-read-gap, the read head is already beyond the point where the dedicated SAM can be read. The standard servo gate window 25A applies except in the write-mode case. Servo gate window 25B is timed to begin at the Integrated Servo sequences 23A, 23B.

The requirements of the servo system during seeking are substantially different than during track following. Because the read heads are moving across tracks some information in the SIDs may not be reliably readable. Integrated Servo sequences are more difficult to read during seeks and can appear to be smeared. Accordingly reliance on detecting the SAM from an Integrated Servo sequence during seeking can be problematic. Therefore, applications allow the separate SAM field to be used during seeks.

However, there are also advantages to including a sync mark function in the Integrated Servo Sequence fields 64 in addition to the standard separate SAM field as is used in embodiments of the present invention. This allows the signal to be detected even when using servo gate window 25B as described above or servo gate window 25C as described below, when writing gapless data sectors. Although a particular servo system might be able to tolerate a failure to detect a single SAM, for example, having the redundancy of being able to detect a timing sync function in the Integrated Servo Sequences fields increases the robustness of the design. In addition, when a sync function is included in the Integrated Servo Sequence field, it needs only be found while in the track-following mode, and there is no need to find it while seeking. This alternative increases the number of usable patterns of sequences from which to choose. It is increased because many patterns that meet the requirements while in the track-following mode, fail to meet them when those patterns are subjected to the distortions caused by seeking. With a greater choice of patterns, it may be possible to identify otherwise unusable sequence patterns which minimize the susceptibility to servo head instabilities because a conventional servo pattern's servo timing mark can be used while seeking.

Figure 6A:
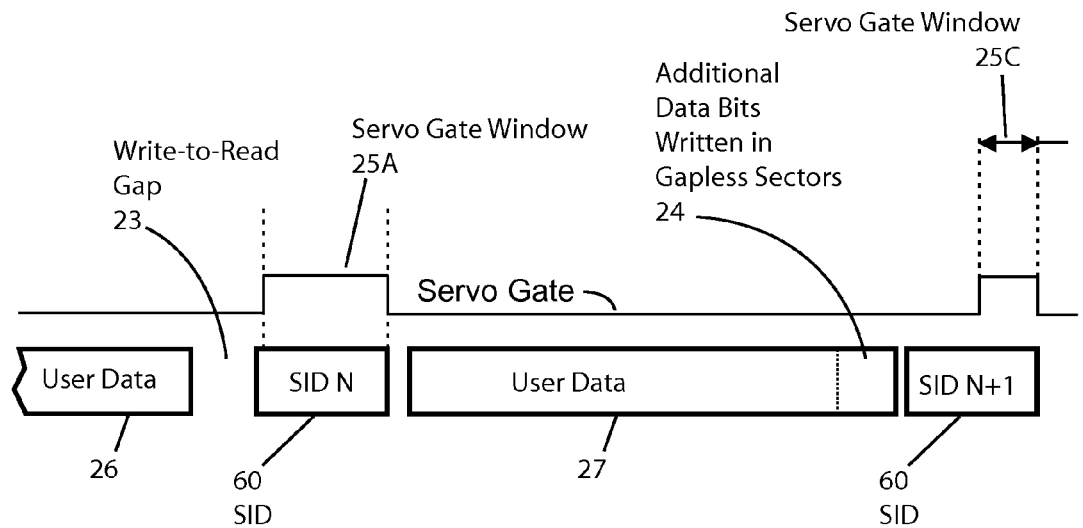
FIG. 6A is an illustration of two consecutive SID fields with alternating write-to-read gaps arranged on a track according to an embodiment of the invention.
Figure 6B:
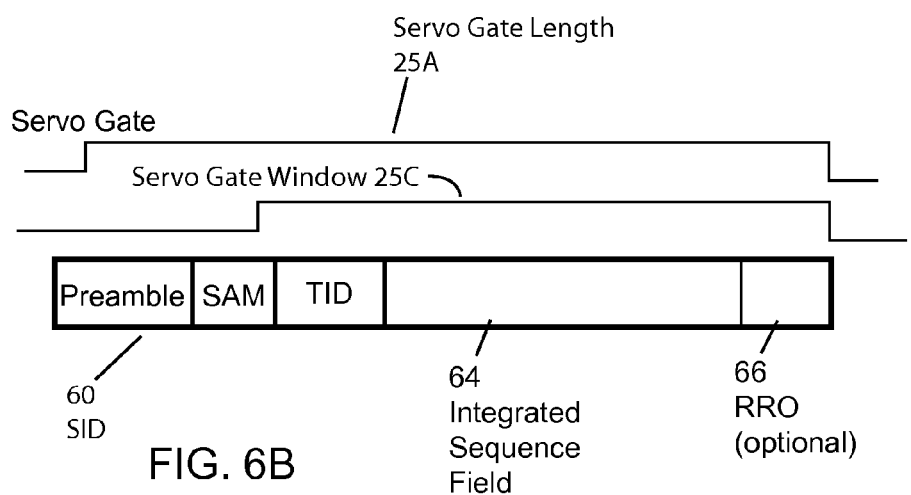
FIG. 6B is an illustration of the servo gate timing for SID fields with alternating write-to-read gaps arranged on a track according to an embodiment of the invention.

FIG. 6A is an illustration of two consecutive SID fields 60 with alternating write-to-read gaps arranged on a track according to an embodiment of the invention. FIG. 6B is an illustration of the servo gate timing for SID fields with alternating write-to-read gaps arranged on a track according to an embodiment of the invention. A servo system according to embodiments the invention includes a servo pattern with SID fields 60 that include Integrated Servo Sequence field 64, the preamble, SAM, TID and optional RRO 66 as shown in FIG. 6B. The Integrated Servo Sequence field 64 includes one or more Integrated Servo Sequences. Embodiments of the invention are not dependent on the details of the implementation of the Integrated Servo Sequence field and, therefore, the principles as described herein apply whether the Integrated Servo Sequence field is implemented with a one, two or more Integrated Servo Sequences. The track format is illustrated in FIG. 6A and includes user data sectors 26 that are followed by write-to-read gaps 23 alternating with extended user data sectors 27 that are not followed by write-to-read gaps and therefore include additional bits 24 written where the gap would otherwise occur. Thus a servo system embodiment includes means for omitting write-to-read gaps in the selected servo sectors. In this example, write-to-read gaps are omitted before alternating servo sector SIDs, but other repeating patterns of gapped and ungapped sectors are possible. A dedicated sync mark (SAM) field is included in each servo sector SID 60. Following a write operation, which writes an extended user data sector 27 without a write-to-read gap, the start of servo gate window 25C is delayed in comparison to servo gate window 25A. The requirement is that servo gate window 25C be active in time to begin reading at the Integrated Servo Sequence field 64. Therefore the exact timing of the start of the servo gate window 25C can vary from what is shown in FIG. 6B, but in all embodiments it is expected that the SAM will not be readable. When servo gate window 25C is used, the servo sync timing is obtained from reading/detecting the one or more sequences in Integrated Servo Sequence field 64.

This timing provides advantages over the prior art minimode servo technique as illustrated in FIGS. 3 and 4, which does not provide sync-mark to sync-mark timing between each servo SID, i.e., it only syncs between every other SID when writing extended user data sectors. Embodiments of the invention include sync mark timing for each SID (not just every other SID) even when writing extended user data sectors. Thus, in embodiments of the invention, consecutive sectors on a track (including an entire) can be written with half of the sectors having no write-to-read gaps and still have servo time syncing in each SID as the disk rotates under the slider. For the alternating (e.g. even) servo sectors using servo gate timing 25A, the dedicated sync mark (SAM) field is read and provides the servo sector sync timing. For the alternating (e.g. odd) servo sectors using servo gate timing 25C, the servo sync timing is obtained from reading/detecting the one or more sequences in Integrated Servo Sequence field 64. This servo gate timing provides advantages over the prior art Integrated Servo technique as illustrated in FIG. 5A which does not read the dedicated sync mark (SAM) field when in writing mode as discussed above. Thus, in embodiments of the invention, user data space gained by having the gapless sectors in maintained without loss of sync-mark timing between SID bursts. During seeking and reading operations full SIDs can be read for every servo wedge as in the prior art. The gapless SIDs are used during read operations as in the prior art. Thus reading a set of user data bits in a sector with or without a write-to-read is followed by the standard assertion of the servo gate to enable the read head to detect the SAM field in the following SID for time syncing.

The invention claimed is:

1. A method of operating a disk drive having tracks on a rotating disk that includes a plurality of angularly spaced servo identifier (SID) fields delineating sectors with each SID field including a servo address mark (SAM) field and at least one Integrated Servo sequence, the disk drive having a slider with a write head and a read head that is positionable over a track on the rotating disk, the method comprising:
    writing a first set of data bits in a first sector preceding a selected SID N on a selected track with the first set of data bits being positioned with a write-to-read gap between first set of bits of data and SID N, and then asserting a servo gate for a first selected time interval to enable the read head to detect the SAM field in SID N for time syncing; and
    writing a second set of data bits in a second sector positioned between the SID N and an SID N+1 with the second set of data bits being positioned without a write-to-read gap between the second set of data bits and SID N+1, where the second set of data bits contains a higher number of bits than the first set of data bits, then asserting the servo gate, for a second selected time interval that is shorter than the first selected time interval, after at least a portion of the SAM field in SID N+1 has passed under the read head, and then using at least one Integrated Servo sequence in SID N+1 for time syncing.

2. The method of claim 1 wherein each track on the rotating disk includes sectors written with a write-to-read gap in an alternating pattern with sectors written without a write-to-read gap.

3. The method of claim 2 further comprising writing sets of data bits in a plurality of consecutive sectors positioned following SID N+1 and alternately time syncing using the SAM field in each SID that has a preceding write-to-read gap and then time syncing using at least one Integrated Servo sequence in each SID that does not have a preceding write-to-read gap.

4. The method of claim 2 further comprising reading the first set of data bits and then asserting a servo gate to enable the read head to detect the SAM field in SID N for time syncing; and reading the second set of data bits and then asserting a servo gate to enable the read head to detect the SAM field in SID N+1 for time syncing.

5. The method of claim 1 wherein the SID N includes a first repeatable run-out field and the SID N+1 includes a second repeatable run-out field and wherein the second selected time interval extends to enable reading the second repeatable run-out field.

6. A disk drive comprising:
    a rotatable disk with a plurality of tracks, the tracks including a plurality of angularly spaced servo identifier (SID) fields delineating sectors with each SID field including a servo address mark (SAM) field that provides a first source of time syncing when read by a read head as the disk rotates under the read head and at least one Integrated Servo sequence that provides a second source of time syncing when read by the read head, and wherein tracks on the rotating disk includes sectors written with a write-to-read gap in an alternating pattern with sectors written without a write-to-read gap; and
    a servo system that uses the SAM field in a selected SID N for time syncing after writing a first set of data bits in a first sector with a write-to-read gap preceding the selected SID N on a selected track, and uses at least one Integrated Servo sequence in a following SID N+1 on the selected track for time syncing after writing a second set of data bits in a following sector without a write-to-read gap preceding SID N+1 on the selected track, and wherein the second set of data bits is larger than the first set of data bits.

7. The disk drive of claim 6 wherein the servo system detects the at least one Integrated Servo sequence in SID N+1 for time syncing by asserting a servo gate signal for a selected time interval after at least a portion of the SAM field in SID N+1 has passed under the read head.

* * * * *